July 23, 1957 S. H. FAIRWEATHER ET AL 2,800,595
LOAD DIVISION SYSTEM USING INTERCONNECTED SENSING DEVICES
Filed Aug. 13, 1954
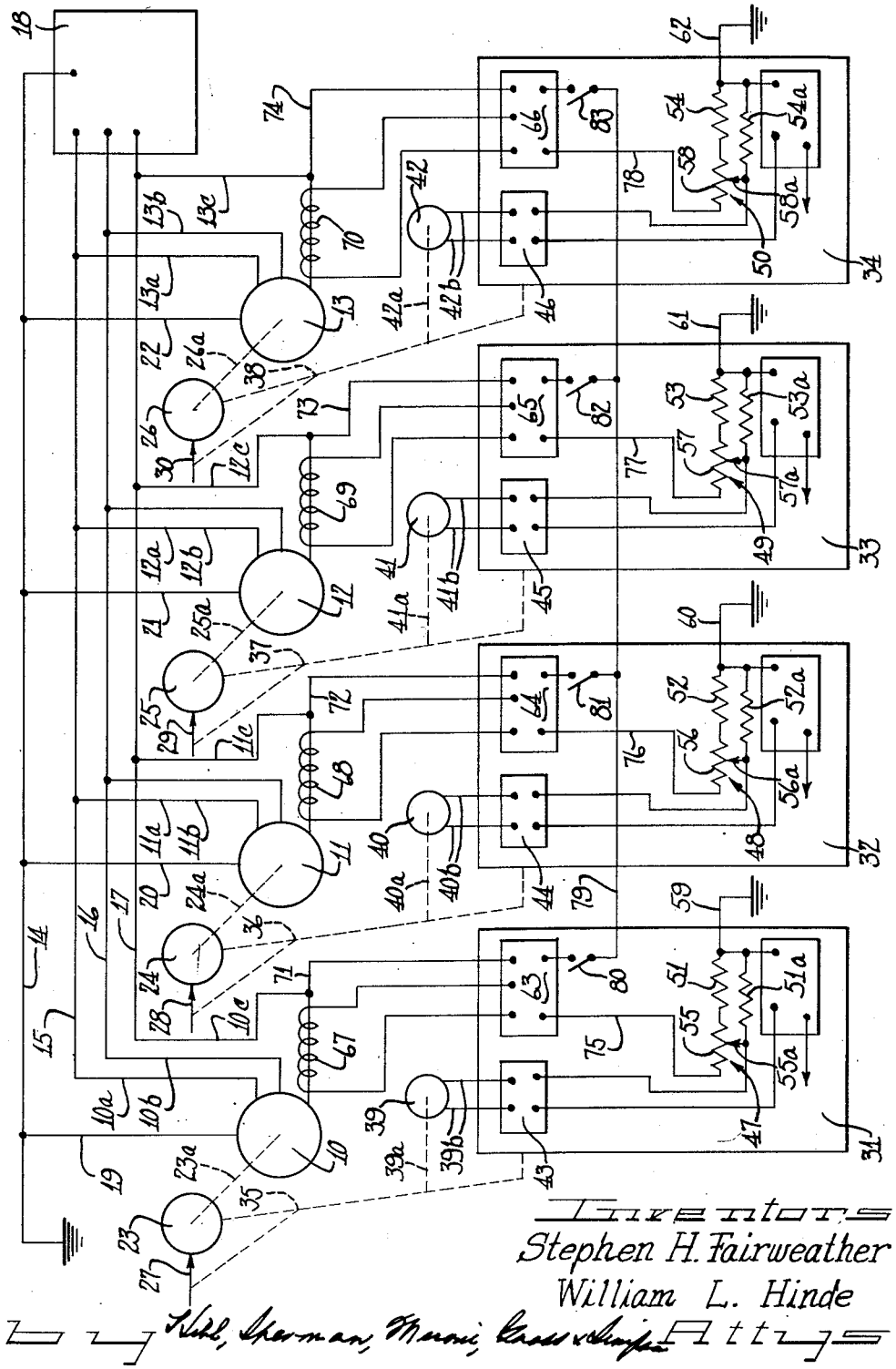
Inventors
Stephen H. Fairweather
William L. Hinde United States Patent Office
2,800,595
Patented July 23, 1957

2,800,595
LOAD DIVISION SYSTEM USING INTERCONNECTED SENSING DEVICES

Stephen H. Fairweather, South Euclid, and William L. Hinde, Euclid, Ohio, assignors to Thompson Products, Inc., Cleveland, Ohio, a corporation of Ohio Application August 13, 1954, Serial No. 449,673

15 Claims. (Cl. 307—57)

The present invention relates to the provision of a load division system using interconnected sensing devices, and more particularly to a system for substantially equally dividing the load between parallel connected alternators.

Still more particularly, the present invention relates to a system for interconnecting the alternator controls such as those described in the application for United States Letters Patent by Walter R. Chapman and Stephen H. Fairweather, entitled "Control System for Turbine Driven Alternators," Ser. No. 382,582, filed September 28, 1953. In that application there is described a transducer control system operable to control the droop characteristic of an alternator by sensing the load on the alternator and the speed thereof to govern the input speed and power to the alternator. The speed sensing network therein described includes such means as a tachometer generator coupled to the alternator so that its output frequency is directly correlated to the alternator, and a frequency discriminator network which is operable to have an output of a magnitude in sign in accordance with variations of the frequency input thereto from a pre-set or preselected frequency. Thus, one of the actuating signals for the transducer control system is a signal which is in accordance with the speed in the alternator and the variation of that speed from a preselected or predetermined speed so that the transducer control system will control the input power to the alternator to bring the speed thereof back to the preset speed therefor.

The transducer control system described in the above identified application also includes a load sensing network which has an output in the transducer control system in accordance with the real load on the alternator control thereby. With these two sensing means in the transducer control system the input speed and power to the alternator may be so controlled that the alternator will have a predetermined "manufactured" droop characteristic which may be maintained accurately within preselected limits.

When operating the alternator in parallel connection with another or a plurality of other alternators each of which is provided with the same kind or a similar transducer control system, so that the droop characteristics of the alternators are substantially identical, the loads on the individual alternators, or the portion of the common load assumed by the respective alternators, will be substantially equal.

Due to possible inherent and operating errors in the components of the transducer control systems and possible unbalances therebetween, it is possible that the alternators may not have the load divider equal therebetween. Under such operating conditions, the more heavily loaded alternator would tend to assume a still greater portion of the load while the more lightly loaded alternators would tend to give up a greater portion of the load whereby the more heavily loaded alternators would tend to assume all of the load and possibly "burn-up" while the more lightly loaded alternators would give up so much of their load that they would possible operate as motors thereby entirely defeating the purpose of paralleling the alternators.

To correct such errors and to guard against such possible difficulties, it is one of the important features of the present invention to so interconnect the transducer control systems that unbalances between the operating parameters of the alternators may be corrected and compensated for whereby the alternators will operate isochronously with the load substantially equally divided therebetween. One manner of achieving this important object, and in accordance with the principles of the present invention, is to parallel interconnect the outputs of the load sensing networks in the transducer control systems so that unbalances between the outputs will so affect the transducer control systems as to bring the systems into a balanced relationship.

Still another important feature of the present invention lies in so interconnecting the transducer control systems that the load sensing signals therein will be substantially canceled out when the alternators are operating with substantially equal loads thereon whereby speed sensing signals in the transducer control systems will so control the transducer control systems as to operate the alternators at a substantially constant speed, and isochronously, under substantially all load conditions.

This latter feature of the present invention assumes great importance since various electrical devices may be operated with much greater accuracy and be constructed with much greater economy if the input frequency thereto may be held substantially constant. An example of such a type of installation is in aircraft electrical systems where many of the operating units may be made much lighter in weight and with much greater operating accuracy if the input frequency thereto can be held within very close limits. The interconnection system of the present invention is operable to maintain the output frequency of the alternators within those close limits thus permitting aircraft to carry an increased "payload."

These and other objects, features and advantages of the present invention will become readily apparent and more fully developed in the following detailed description of the present invention and embodiment thereof, from the claims, and from the accompanying drawings which fully and completely disclose each and every detail shown thereon, and which schematically illustrates an embodiment of the present invention.

For purposes of economy and efficiency of operation in electrical power installations generally and in aircraft electrical power installations in particular, it is desirable to provide the power to the load by a plurality of alternators which are connected together in parallel. This is desirable since light loads may be supplied by the output of but one or two alternators while heavier loads may be supplied by connecting into the system three or four or more alternators. In the system illustrated in the drawings, four alternators, 10, 11, 12 and 13 supply power to a common bus system including busses 14, 15, 16 and 17 connected to the common load 18. In the system shown the alternators are three phase alternators having grounded neutrals 19, 20, 21, and 22 which are connected to the grounded bus 14, it being understood, of course, that the grounded neutrals may be connected to ground in any particular desired manner and the load may or may not be connected to ground, as desired. The A, B, C phase busses 15, 16 and 17 are supplied with power from the alternator A, B, C phase leads 10a, 10b and 10c, 11a, 11b and 11c, 12a, 12b and 12c, and 13a, 13b and 13c respectively.

In an aircraft installation the alternators 10, 11, 12 and 13 are preferably driven through gear boxes by pneumatic turbines such as those indicated at 23, 24, 25 and 26 respectively as indicated by the mechanical coupling lines 23a, 24a, 25a, and 26a. The pneumatic turbines may be supplied with air power by any desired air system supplying air to the individual alternators as indicated by the arrow segments 27, 28, 29 and 30 respectively. The turbines and the air supply for each of the alternators is controlled in speed and power by transducer control systems such as those described in the above identified application of Walter R. Chapman and Stephen H. Fairweather and indicated schematically by the boxes 31, 32, 33 and 34 which are coupled to the turbines and the air supply lines thereto as indicated by the broken mechanical coupling lines 35, 36, 37 and 38.

As set out hereinabove, the transducer control systems 31 through 34 include speed sensing means for the alternators 10 through 13 respectively by having such means as tachometer generators 39, 40, 41, and 42 coupled to the alternators as indicated by the broken mechanical coupling lines 39a, 40a, 41a, and 42a and connected to a frequency discriminator networks 43, 44, 45 and 46 to provide output signals in the transducers in accordance with the variation of the speed of the alternators from a pre-set speed since the output of the tachometer generators 39 through 42 is of a frequency which may be the same as the output frequency of the alternators 10 through 13 and which is at least indicative of and in accordance with the speed of the alternators 10 through 13 respectively. The output of the tachometer generators 39 through 42 may be set to the frequency discriminator networks 43 through 46 as by connecting the same together through the leads 39b—39b, 40b—40b, 41b—41b, and 42b—42b.

The output from the frequency discriminator networks 43 through 46 is fed to mixer networks 47, 48, 49 and 50 respectively having input resistors 51, 52, 53 and 54 and which also may be provided with matching potentiometers 55, 56, 57 and 58 in series therewith. This series input resistance network is further paralleled with second input resistances 51a, 52a, 53a, and 54a, so that the efficiency of the mixer network is increased and the number of ground connections in the system may be substantially reduced. The movable contacts 55a, 56a, 57a, and 58a are operatively arranged to match the several transducers and mixing networks thereof together. In the embodiments shown one end of each of the mixing networks is grounded as at 59, 60, 61 and 62.

The transducer control systems 31, 32, 33 and 34 also include load sensing networks 63, 64, 65 and 66 which are supplied with signals from the alternators respectively to sense the real loads thereon and supply real load sensing signals to the mixing networks.

One manner of feeding load sensing networks 63, 64, 65 and 66 with appropriate signals so that the output of the load sensing networks will be in accordance with the real loads on the alternators 10, 11, 12 and 13, or the proportion of the load 18 carried thereby respectively, is to couple the real load sensing networks 63 through 66 to one of the alternator output leads, for each of the alternators, such as the leads 10c, 11c, 12c and 13c as by current transformers 67, 68, 69 and 70 respectively, which will feed current signals to the real load sensing networks, and by connecting the real load sensing networks directly to the lines 10c, 11c, 12c and 13c as by leads 71, 72, 73 and 74 respectively.

Thus, with the transducers 31, 32, 33 and 34 being actuated and energized by such sensing signals of preselected parameters of the operating conditions of the alternators 10 through 13, as a speed sensing signal and a real load sensing signal, the transducer control systems will be operative to control the pneumatic turbines 23 through 26 and the supply lines 27 through 30 thereto as to operate and drive the alternators while maintaining the same operative on a predetermined droop characteristic. It has been found, however, to be most advantageous to tie the systems together whereby each of the transducers will be provided with signals which will actuate the transducers to correct unbalances therebetween and unbalances between the operating parameters of the alternators 10, 11, 12 and 13. To this end, at their output sides, the load sensing systems are connected together in parallel through the resistance elements of the mixing circuits respectively. That is, one of the output terminals of each of the load sensing networks is connected to the mixing networks at 75, 76, 77 and 78, while the other sides thereof are connected together as by a lead 79. In addition, the outputs of the load sensing networks are connected to the common connecting lead 79 through switch means 80, 81, 82, and 83, which switches are closed when the alternator control is operating and open when the alternator controls are respectively disconnected.

With this alternator connection, any variation between the outputs of the separate load sensing units will cause circulating currents whereby appropriate potentials will appear across the resistors of the mixing networks to correct the input drive and power to the alternators respectively whereby the loads on the alternators will be maintained in a balanced condition and so that the principal load 18 will be substantially equally divided between the alternators. When the loads are equally divided between the alternators the outputs of the load sensing units will be substantially equal and no such corrective circulating currents will be present. In such an instance the outputs of the load sensing networks will be balanced out and no load sensing signal will appear across the resistors 51 through 58 out of the mixing circuits. Thus, the only control potentials in the transducer control systems will be those from the speed sensing networks 43 through 46 which will tend to bring the speed of several alternators back to the preset speed should they vary therefrom, whereby the alternators will be run at a substantially constant speed in accordance with the principles of the present invention.

It will be understood, of course, that numerous variations and modifications may be made without departing from the true spirit and scope of the novel concepts and principles of the invention. We, therefore, intend to cover all such modifications and variations.

We claim as our invention:

1. A system to substantially equally divide a load between parallel interconnected alternators and to cause the same to operate synchronously and isochronously wherein the input speed and power of the alternators is controlled by an independent transducer control system for each of the alternators respectively, each of said transducer control systems having means therein to sense the load on the alternator controlled thereby respectively, and means interconnecting the load sensing means of said transducer control systems together at the output of the load sensing means respectively whereby each of the alternators is so controlled that variations between the loads on the individual alternators will be corrected and the alternators will be operated synchronously and isochronously with equal loads thereon.

2. A system to substantially equally divide a load between parallel interconnected alternators and to cause the same to operate synchronously and isochronously wherein the input speed and power of the alternators is controlled by an independent transducer control system for each of the alternators respectively, each of said transducer control systems having means therein to sense the load on the alternator controlled thereby respectively, and means interconnecting the load sensing means of said transducer control systems together in parallel at the output of the load sensing means respectively whereby each of the alternators is so controlled that variations between the loads on the individual alternators will be corrected and the alternators will be operated synchronously and isochronously with equal loads thereon.

3. A system to substantially equally divide a load between parallel interconnected alternators and to cause the same to operate synchronously and isochronously wherein the input speed and power of the alternators is controlled by an independent transducer control system for each of the alternators respectively, each of said transducer control systems having means therein to sense the load on the alternator controlled thereby respectively, and means interconnecting the load sensing means of said transducer control systems together in parallel whereby each of the alternators is so controlled that variations between the loads on the individual alternators will be corrected and the alternators will be operated synchronously and isochronously with equal loads thereon.

4. A system to substantially equally divide a load between parallel interconnected alternators and to cause the same to operate synchronously and isochronously wherein the input speed and power of the alternators is controlled by an independent transducer control system for each of the alternators respectively, and means connecting said transducer control systems together in parallel at the output of the load sensing means respectively whereby each of the alternators is so controlled that variations between the loads on the individual alternators will be corrected and the alternators will be operated synchronously and isochronously with equal loads thereon.

5. A system to substantially equally divide a load between parallel interconnected alternators and to cause the same to operate synchronously and isochronously wherein the input speed and power of the alternators is controlled by an independent transducer control system for each of the alternators respectively, each of said transducer control systems having means therein to sense predetermined operating parameters of the alternators respectively, said means being connected together in parallel at the output of the operating parameter sensing means respectively whereby each of the alternators is so controlled that variations between the operating parameters of the individual alternators will be corrected and the alternators will be operated synchronously and isochronously with equal operating parameters.

6. In an electrical power installation wherein a plurality of alternators are to be connected together in parallel to each assume an equal portion of the load and wherein each of the alternators is coupled to drive mechanism having the input speed and power thereto controlled by an independent transducer control system, a real load sensing network in the transducer control system for each of said alternators respectively to sense the real load on each of said alternators respectively and provide an output in accordance therewith, and means connecting the output side of each of said real load sensing networks in parallel whereby each of the alternators is so controlled that unbalances therebetween will be corrected and said transducer control systems will maintain synchronous and isochronous operation of the alternators with the load equally divided therebetween.

7. In an electrical power installation wherein a plurality of alternators are to be connected together in parallel to each assume an equal portion of the load and wherein each of the alternators is coupled to drive mechanism having the input speed and power thereto controlled by an independent transducer control system, a real load sensing network in the transducer control system for each of said alternators respectively to sense the real load on each of said alternators respectively and provide an output in accordance therewith, and means connecting the output side of each of said real load sensing networks in parallel whereby each of the alternators is so controlled that unbalances therebetween will be corrected and said transducer control systems will maintain synchronous and isochronous operation of the alternators with the load equally divided therebetween, and means to match the transducer control systems to each other.

8. In an electrical power installation wherein a plurality of alternators are to be connected together in parallel to each assume an equal portion of the load and wherein each of the alternators is coupled to drive mechanism having the input speed and power thereto controlled by an independent transducer control system, a real load sensing network in the transducer control system for each of said alternators respectively to sense the real load on each of said alternators respectively and provide an output in accordance therewith, and means connecting the output side of each of said real load sensing networks in parallel whereby each of the alternators is so controlled that unbalances therebetween will be corrected and said transducer control systems will maintain synchronous and isochronous operation of the alternators with the load equally divided therebetween, and means to disconnect each of the networks from the others thereof when the corresponding alternators are out of use.

9. In a system for controlling a plurality of alternators connected together in parallel to divide a load thereon substantially equally therebetween and to maintain the speed of the alternators substantially constant, an independent transducer control system connected to each of the alternators respectively to control the input power thereto, a load sensing network in each of the transducer control systems and coupled to the respective alternators to energize the transducer control systems in accordance with the loads on said alternators, said load sensing network being interconnected to cancel balanced signals therefrom whereby said transducer control systems are actuated by load sensing signals in each thereof in accordance with load unbalances between the alternators.

10. In a system for controlling a plurality of alternators connected together in parallel to divide a load thereon substantially equally therebetween and to maintain the speed of the alternators substantially constant, an independent transducer control system connected to each of the alternators respectively to control the input power thereto, a load sensing network in each of the transducer control systems and coupled to the respective alternators to energize the transducer control systems in accordance with the loads on said alternators, and speed sensing means to actuate the transducer control systems in accordance with variations in the speed of the alternators from a preselected speed, said load sensing network being interconnected to cancel balanced signals therefrom whereby said transducer control systems are actuated by load sensing signal in each thereof in accordance with load unbalances between the alternators.

11. In a system for controlling a plurality of alternators connected together in parallel to divide a load thereon substantially equally therebetween and to maintain the speed of the alternators substantially constant, an independent transducer control system connected to each of the alternators respectively to control the input power thereto, a load sensing network in each of the transducer control systems and coupled to the respective alternators to energize the transducer control systems in accordance with the loads on said alternators, said load sensing network being interconnected in parallel to cancel balanced signals therefrom whereby said transducer control systems are actuated by load sensing signals in each thereof in accordance with load unbalances between the alternators.

12. In a system for controlling a plurality of alternators connected together in parallel to divide a load thereon substantially equally therebetween and to maintain the speed of the alternators substantially constant, an independent transducer control system connected to each of the alternators respectively to control the input power thereto, a load sensing network in each of the transducer control systems and coupled to the respective alternators to energize the transducer control systems in accordance with the loads on said alternators, said load sensing network being interconnected in parallel at the outputs thereof to cancel unbalanced signals therefrom whereby said transducer control systems are actuated by load sensing signals in each thereof in accordance with load unbalances between the alternators.

13. In a system for controlling a plurality of alternators connected together in parallel to divide a load thereon substantially equally therebetween, an independent transducer control system connected to each of the alternators respectively and sensing preselected operating parameters of the alternators to control input powers thereto, and circuitry interconnecting said transducer control systems to cancel signals therein sensed from certain of said operating parameters when the same are equal whereby the alternators are each controlled to operate synchronously and at a substantially constant speed with the load divided substantially equally therebetween.

14. In a system for controlling a plurality of alternators connected together in parallel to divide a load thereon substantially equally therebetween, an independent transducer control system connected to each of the alternators respectively and sensing the load and speed of the alternators to control input power thereto, and circuitry interconnecting said transducer control systems to cancel signals therein sensed from the load on the alternators when the same are equal whereby the alternators are each controlled to operate synchronously and at a substantially constant speed with the load divided substantially equally therebetween.

15. In a system for controlling a plurality of alternators connected together in parallel to divide a load thereon substantially equally therebetween, an independent transducer control system connected to each of the alternators respectively and sensing preselected operating parameters of the alternators to control input powers thereto, the circuitry interconnecting said transducer control systems in parallel to cancel signals therein sensed from certain of said operating parameters when the same are equal whereby the alternators are each controlled to operate synchronously and at a substantially constant speed with the load divided substantially equally therebetween.

References Cited in the file of this patent

UNITED STATES PATENTS 2,504,768     Watson et al.  ---------- Apr. 18, 1950